W. E. DAVIS.
WOOD BORING TOOL.
APPLICATION FILED FEB. 8, 1916.
1,185,380. Patented May 30, 1916.
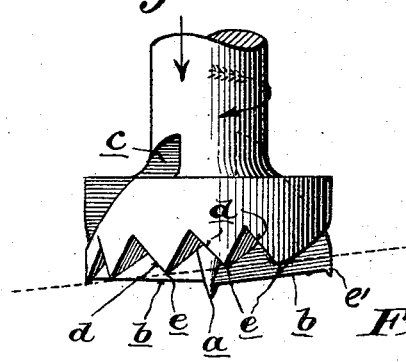
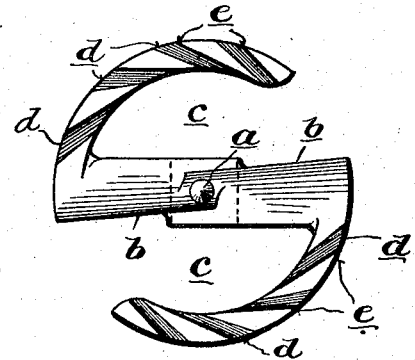
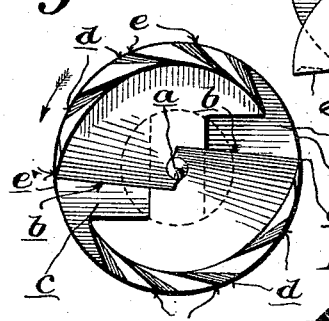
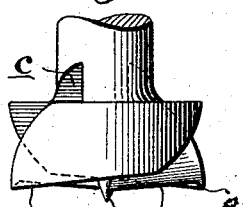
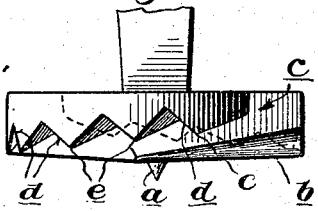
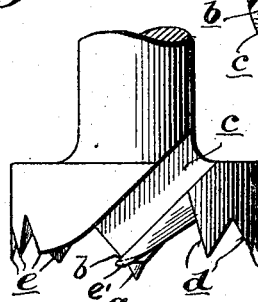
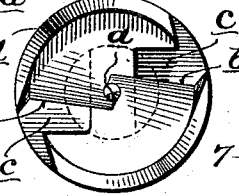
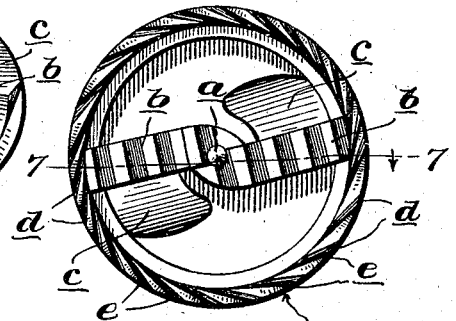
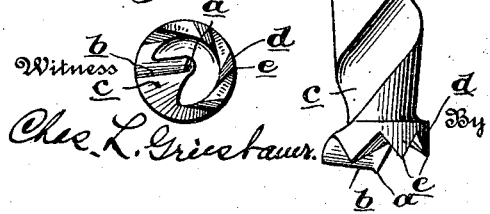
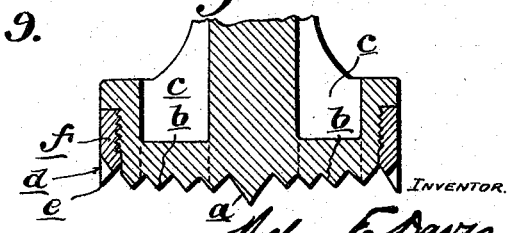

UNITED STATES PATENT OFFICE.

WILLIAM E. DAVIS, OF NEW IPSWICH, NEW HAMPSHIRE.

WOOD-BORING TOOL.

1,185,380.  Specification of Letters Patent.  Patented May 30, 1916.

Application filed February 8, 1916. Serial No. 76,966.

*To all whom it may concern:*

Be it known that I, WILLIAM E. DAVIS, a citizen of the United States of America, and a resident of New Ipswich, county of Hillsboro, State of New Hampshire, have invented certain new and useful Improvements in Wood-Boring Tools, of which the following is a full and clear specification.

This invention relates to that type of wood boring tools embodying one or more radial or tangential blades adapted to cut a shaving as the tool enters the wood, and circumferential cutters at the outer ends of the blades adapted to define and cut the wall of the hole.

It is the design of my invention to so construct the circumferential cutter in particular that the boring operation may be performed more rapidly and with a less expenditure of energy than is possible with the boring tools now known.

Referring to Figures 1, 2 and 3 of the drawings annexed, $a$ designates the usual central entering point, $b$ a pair of tangential cutting blades located at the rear edges of the shavings-discharge throats $c$. At the outer end of each of the blades $b$ is formed a circumferential cutter which extends from the blade backwardly around to the forward wall of the other throat or passage $c$. This circumferential cutter consists of a series of teeth, each having a forward cutting edge $d$ and an entering point $e$, so that these teeth form in effect a series of cutters arranged one behind the other.

The essential feature of my device is that the teeth of the circumferential cutter are so positioned that their entering points shall be on a line inclining from the outer end of the cutter backwardly, as shown by the dotted line in Fig. 1, that is to say, beginning with the first tooth of the circumferential cutter, the entering point of each tooth will be slightly higher than the entering point of the preceding tooth, while, of course, all the cutting edges $d$ of the teeth will lie in circumferential alinement. I have found from many actual experiments that with a circumferential cutter constructed in this manner the tool will enter the wood more rapidly and with a much less expenditure of power than where the teeth are arranged in the same horizontal plane, and I believe this result is due to the fact that with the teeth as thus arranged the work is distributed approximately equally among the teeth of each set, so that each tooth performs but a small modicum of the work of making the circular cut. This will be understood when it is kept in mind that the cutters follow a spiral path as they enter the wood. It is of course understood that it is essential that the entering points $e$ shall be sharpened and also that the front edge $d$ of each tooth shall be sharpened, at least toward its lower end.

In Figs. 4 and 5 I show a similar type of tool, except that the shavings-clearances $c$ have greater capacity, this type of tool being desirable in working with soft wood.

In Figs. 6 and 7 I illustrate a similar type of cutter showing the circumferential cutters mounted on a separate ring $f$ screwed on to the head of the tool, so as to be removable therefrom for renewal and sharpening. In these views I also show a heavier type of blade $b$ which is transversely notched.

In Figs. 8 and 9 I show my invention applied to a smaller type of cutter, in which there is but a single radial cutting blade $b$ and in which the shavings-clearance $c$ is a spiral groove in the shank of the tool.

In Figs. 10 and 11 I show a type of device in which the circumferential cutters are not toothed, but are plain cutting edges. This form of device is not so desirable as the one in which the circumferential cutters are toothed as above described, but I have found in practice that it has advantages over the common boring tool now in use.

I have found in practice that a tool constructed as described enters the wood speedily and with the least possible effort and also makes a clean, smooth hole, as well as reduces splitting and splintering to a minimum at the exit side of the hole, where the hole is bored clear through the wood.

I have found in practice that it contributes to easy operation to have one of the blades $b$ lower than the other one, and I have also found that the tool enters the wood with less effort when the cutting edges of these blades $b$ are inclined upwardly and outwardly, as shown in Fig. 1. I have also found it desirable to locate a cutting tooth $e'$ at the outer end of each of the blades $b$, these cutters $e'$ serving to assist the teeth to the rear of them in cutting the circular kerf for the succeeding blade $b$.

Having thus described my invention, what I claim is:

1. A wood boring tool consisting of a shank and a head, said head being provided with a main cutting blade, and with a circumferential cutter extending from the outer end of said blade backwardly therefrom around the head and having its cutting edge inclining upwardly and backwardly.

2. A wood boring tool consisting of a shank and a head, said head being provided with a main cutting blade and with a circumferential cutter extending from the outer end of said blade backwardly therefrom around the head and having its cutting edge inclining upwardly and backwardly, said circumferential edge being notched to form a series of teeth having forward cutting edges and entering points.

3. A wood boring tool consisting of a shank and a head, said head being provided with a pair of main cutting blades extending from the center to the circumference of the head and arranged one slightly above the other, and a circumferential cutter arranged behind the outer end of each blade.

4. A wood boring tool consisting of a shank and a head, said head being provided with a pair of main cutting blades extending from the center to the circumference of the head and having their cutting edges inclined upwardly and outwardly, and a circumferential cutter behind the outer end of each of said blades.

5. A wood boring tool consisting of a shank and a head, said head being provided with a pair of cutting blades extending from approximately the center of the head to the circumference thereof, and circumferential cutting means consisting of a series of teeth arranged behind the outer end of each of said cutting blades, one of said teeth being formed at the outer extremity of the blade, the cutting point of each tooth in each series terminating at a point slightly higher than the preceding cutting point.

6. In a wood boring tool comprising a shank and a boring head, said head being provided with main cutting or shaving blades, shavings-discharge throats, and a circumferential cutter for each of said blades, these cutters being carried by a ring removably connected to said head.

In testimony whereof I hereunto affix my signature.

WILLIAM E. DAVIS.

Copies of this patent may be obtained for five cents each, by addressing the "Commissioner of Patents. Washington, D. C."